Jan. 17, 1956 K. W. BINDING 2,731,181
AUTOMOBILE TOP CARRIERS FOR LARGE OBJECTS
Filed Sept. 24, 1953 2 Sheets-Sheet 1

Inventor
Kenneth W. Binding
by Roberts, Cushman & Grover.
Att'ys.

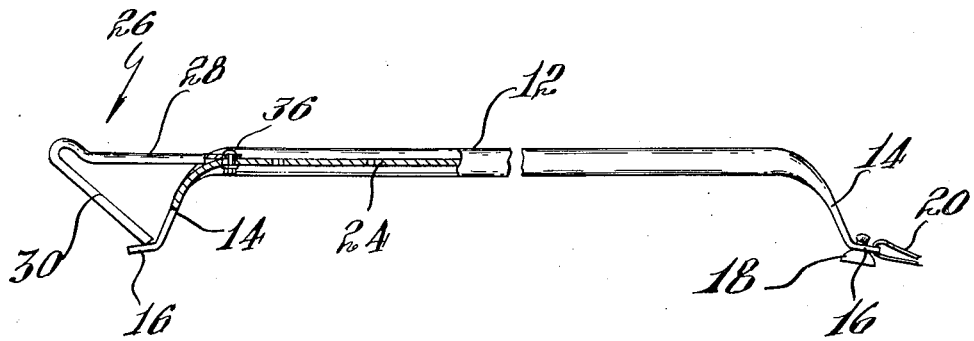
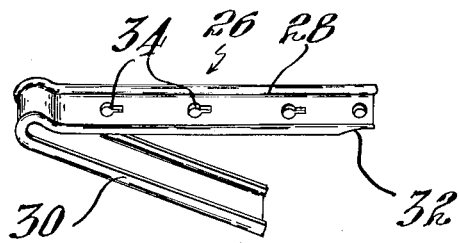
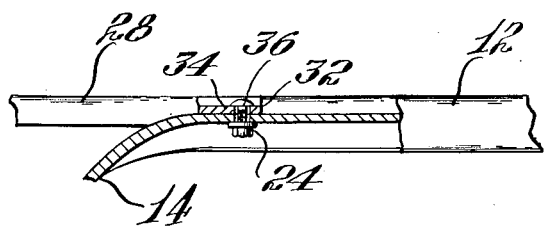
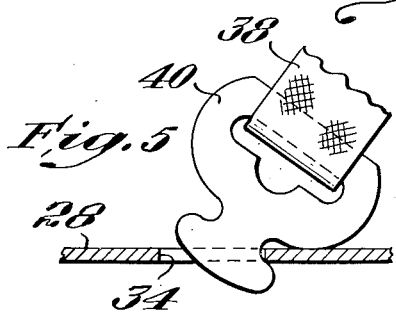

United States Patent Office 2,731,181
Patented Jan. 17, 1956

2,731,181

AUTOMOBILE TOP CARRIERS FOR LARGE OBJECTS

Kenneth W. Binding, Medford, Mass., assignor to Leo M. Beckwith, Brookline, Mass.

Application September 24, 1953, Serial No. 382,032

4 Claims. (Cl. 224—42.1)

This invention relates to automobile top carriers and more especially to improvements in carriers of the kind disclosed in my pending application Serial No. 342,925 filed March 17, 1953.

As illustrated in the aforesaid pending application a pair of spaced parallel carrier bars are mounted on the automobile top each of which has a straight, rigid supporting portion supported in spaced parallel relation to the top of the automobile by legs at its ends which terminate in splayed feet for engagement with the top. Flexible straps or webbing connected to the feet and carrying hooks for engagement with the gutters of the top at opposite sides thereof fasten the carrier bars in place. The horizontal supporting portions of the carrier bars have a plurality of apertures or key hole slots therein for reception of keys adapted to be fastened to the ends of straps or ropes for lashing articles to the carrier.

The carrier bars referred to do not extend all the way across the top of the automobile but for most purposes they provide adequate supporting surface for luggage, camping equipment, etc. On occasion, however, a wider supporting surface is desired, not so much for carrying extra luggage as for accommodating a large or bulky object such for example as a rowboat.

Accordingly the principal object of this invention is to provide means for increasing the supporting surfaces of the carriers laterally to at least the full width of the top of the automobile so as to provide ample support for such bulky objects as small boats. Other objects are to provide means for increasing the width of the carrier bars without modifying them in any material aspect and without spoiling their appearance either with or without the added surface area, which may be attached and detached easily, which will afford adequate strength and which can be manufactured easily and inexpensively.

As herein illustrated the surface broadening means are in the form of attachments which are adapted to be placed at each end of each of the carrier bars. Each attachment comprises a flat rigid extension bar adapted to rest at one end on an end of a carrier bar and to extend beyond said end to approximately the lateral extremity of the top of the automobile and a brace connected to the outer extremity of the bar having an end adapted to bear against the splayed foot of the carrier bar at its junction with the leg. The extension bar and brace are in the form of a rigid angle piece in which the extension bar and brace are legs diverging with respect to their place of junction. Preferably the extension bar has a cross section corresponding substantially to that of the carrier bar and its free end is concavely beveled to conform to the convex curvature of the end of the carrier bar at the junction of its supporting surface with its leg. Attaching means engageable with an aperture in the carrier bar is provided for fastening the beveled end of the extension bar thereto, and each extension bar provides a horizontal extension of the carrier bar at that end and has in it one or more key hole slots or apertures for accommodating fastening means.

The invention will now be described in greater detail with reference to the accompanying drawings wherein:

Fig. 2 is a side elevation of one of the carrier bars with the attachment mounted thereon;

Fig. 3 is a perspective view of one of the attachments;

Fig. 4 is a fragmentary elevation to larger scale partly in section at the junction of an attachment with one end of the carrier bar, and Fig. 5 is a detail fastening element.

Figure 1:
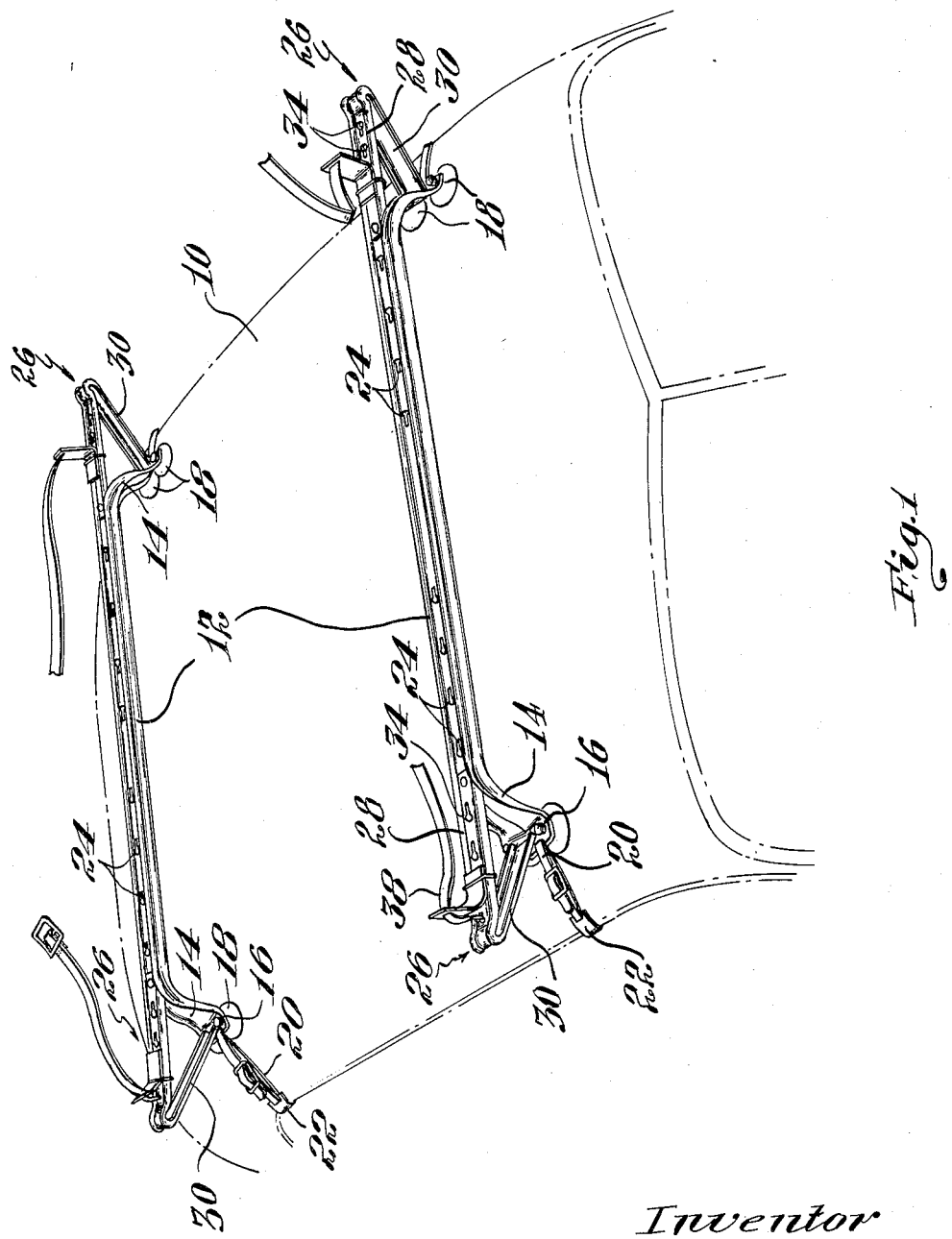
Fig. 1 is an isometric view of the top of an automobile with the carrier bars attached thereto and with the extensions mounted thereon.

Referring to Fig. 1 there is illustrated the tonneau of an automobile having a top 10 upon which are mounted in parallel spaced relation carrier bars 12, each of which has a substantially straight, rigid bearing surface at the opposite ends of which are legs 14 and splayed feet 16 for supporting the bars in spaced parallel relation to the top of the automobile. Vacuum cups 18 are fastened to the feet for cushioning the engagement thereof with the top and flexible straps or webbing 20 threaded through slots in the feet and provided with hooks 22 afford means for attaching the carrier bars to the gutters along opposite sides of the top. The horizontal supporting surface of each carrier bar has in it a plurality of regularly spaced apertures or key hole slots 24. As thus constructed the supporting surfaces of the carrier bars are not as wide as the top of the automobile and while these surfaces usually suffice, on some occasions an object of unusual width is encountered and it is the purpose of this invention to provide means in the form of auxiliary attachments which may be placed at the ends of the carrier bars for increasing their transverse width. These fittings or attachments are especially adapted to increase the widths of the carrier bars for supporting a small boat.

As herein illustrated each attachment 26 comprises a rigid extension bar 28 adapted to extend horizontally from an end of the carrier bar so as to form a substantially continuous horizontal supporting surface and a brace 30 connected to its outer extremity for supporting it. The extension bar 28 and brace 30 are preferably formed by bending bar stock at an acute angle, Fig. 3, so as to provide a pair of rigidly connected diverging legs. The free end of the extension bar 26 is beveled at its underside to provide a concave lip 32, Fig. 3, adapted to conform to the convexity of the carrier bar at the junction of its bearing surface and its leg. Preferably the extension bar 28 has a cross section corresponding substantially to that of the bearing surface of the carrier bar and is provided with a series of regularly spaced key hole apertures 34 at least one of which is close to its free end. A bolt or other attaching element 36 is passed through the aperture 34 in the free end of the extension bar 28 and through a subjacent aperture 24 in the carrier bar for fastening the attachment in place. The angular relation of the extension bar 28 and brace 30 is such that the lower extremity of the brace intersects and abuts the foot 16 at its junction with the leg 14. The free end of the brace is not required to be fastened since it rests in the pocket formed by intersection of the leg 14 and foot 16 which prevents displacement thereof in a vertical plane and is flanked by the upwardly protruding portions of the vacuum cups at opposite sides, thus preventing lateral displacement.

When the attachments 26 are made fast to the ends of the carrier bars their supporting surfaces extend at opposite sides to substantially the full width of the automobile top thus making the carriers useful for mounting objects of much greater transverse width than could be mounted on the unbroadened carrier bars.

Belts or straps 38 of webbing provided with keys 40 such as shown in the aforesaid pending application are supplied for use with the carriers as thus extended and the keys are engageable with the slots 34 in the extensions for lashing an object supported thereby in place.

It should be understood that the present disclosure is for the purpose of illustration only and that this invention includes all modifications and equivalents which fall within the scope of the appended claims.

I claim:

1. For attachment to an article carrier bar for automobile tops which bar when mounted on an automobile top extends transversely thereof and has an article supporting bridge portion intermediate its ends vertically spaced above the top and terminating inwardly of the sides of the automobile and provided with apertures, and has at its ends downwardly extending legs and feet extending at an angle outwardly from the bottom of the legs toward the sides of the automobile, extension members for the ends of the bar, each extension member comprising a rigid extension bar one end of which overlaps the end of the bridge portion and has an aperture in registry with an aperture of the bridge portion, the opposite end of the extension bar extending outwardly toward the adjacent side of the automobile, and a brace connected to said opposite end and inclined downwardly and inwardly the opposite end of the brace bearing on the foot adjacent the junction of the leg and foot, and a fastening element extending through the registered apertures of the bridge portion and rigid extension bar for detachably fastening the extension member to the bridge portion.

2. For attachment to an article carrier bar for automobile tops which bar when mounted on an automobile top extends transversely thereof and has an article supporting bridge portion intermediate its ends vertically spaced above the top and terminating inwardly of the sides of the automobile and provided with apertures, and has at its ends downwardly extending legs and feet extending at an angle outwardly from the bottom of the legs toward the sides of the autmobile, extension members for the ends of the bar, each extension member comprising a rigid angle member having diverging legs, the free end of one leg overlapping the end of the bridge portion and having an aperture in registry with one aperture of the bridge portion and said one leg forming a horizontal continuation, outwardly toward the adjacent side of the automobile, of the upper supporting surface of the bridge portion, the other leg extending downwardly and inwardly with its free end bearing on the foot adjacent the junction of the leg and foot, and a fastening element extending through the registered apertures of the bridge portion and said one leg for detachably fastening the extension member to the bridge portion.

3. Extension members according to claim 1 wherein the extension bars which provide lateral prolongation of the bridge portion have apertures spaced lengthwise thereof for reception of fastening elements.

4. In an article carrier bar for automobile tops which bar when mounted on an automobile top extends transversely thereof and has an article supporting bridge portion intermediate its ends vertically spaced above the top and terminating inwardly of the sides of the automobile and provided with apertures, and has at its ends downwardly extending legs and feet extending at an angle outwardly from the bottom of the legs toward the sides of the automobile, in combination extension member attachments for the ends of the bar, each extension member attachment comprising a rigid extension bar one end of which overlaps the end of the bridge portion and has an aperture in registry with one aperture of the bridge portion, the opposite end of the extension bar extending outwardly toward the adjacent side of the automobile, and a brace connected to said opposite end and inclined downwardly and inwardly the opposite end of the brace bearing on the foot adjacent the junction of the leg and foot, and a fastening element extending through the registered apertures of the bridge portion and rigid extension bar for detachably fastening the extension member attachment to the bridge portion.

References Cited in the file of this patent

UNITED STATES PATENTS

| | | |
|---|---|---|
| 2,222,636 | Strauss | Nov. 26, 1940 |
| 2,434,387 | Brandt | Jan. 13, 1948 |
| 2,469,987 | Pilsner | May 10, 1949 |
| 2,551,351 | Swenson | May 1, 1951 |